United States Patent [19]
Lackman et al.

[11] Patent Number: 5,901,296
[45] Date of Patent: May 4, 1999

[54] DISTRIBUTED SCHEDULING FOR THE TRANSFER OF REAL TIME, LOSS SENSITIVE AND NON-REAL TIME DATA OVER A BUS

[75] Inventors: Robert Andrew Lackman, Wake Forest, N.C.; Edward Robert Vanderslice, Boca Raton, Fla.; Richard Allen Kelley, Apex, N.C.; Donald Ingerman, Raleigh, N.C.; Thomas Basilio Genduso, Apex, N.C.

[73] Assignee: International Business Machines Corporation, Armonk, N.Y.

[21] Appl. No.: 08/760,914

[22] Filed: Dec. 6, 1996

[51] Int. Cl.⁶ ..................................................... G06F 13/18
[52] U.S. Cl. ......................... 395/293; 395/294; 395/299; 395/728; 395/729; 395/730; 395/731
[58] Field of Search .................................. 395/294, 299, 395/300, 351, 730, 732, 200.55, 200.56, 849, 670, 672, 674, 309, 296, 728, 729, 731

[56] References Cited

U.S. PATENT DOCUMENTS

| | | | |
|---|---|---|---|
| 4,814,974 | 3/1989 | Narayanan et al. | 395/732 |
| 4,924,380 | 5/1990 | McKinney et al. | 395/291 |
| 5,276,818 | 1/1994 | Okazawa et al. | 395/294 |

OTHER PUBLICATIONS

A File System for Continuous Media, David P. Anderson, Yoshitomo Osawa and Ramesh Govindan ACM Transactions on Computer Systems vol. 10, No. 4, Nov. 1992, pp. 311–337.

I/O Issues in a Multimedia System, A.L. Narashimha Reddy and James C. Wyllie; IEEE Computer; Mar. 1994; pp. 69–74.

Scheduling Real–Time Transactions: A Performance Evaluation, Robert K. Abbott, and Hector Garcia–Molina. ACM Transactions on Database Systems, vol. 17, No. 3, Sep. 1992, pp. 513–560.

Performance Improvement of Fast Packet Switching by LDOLL Queueing, G.A. Awater and F.C. Schoute, INFOCOM 1992, pp. 4C.4.1–4C.4.7.

Scheduling Policies for Real–Time and Non–Real–Time Traffic in a Statistical Multiplexer, Renu Chipalkatti, James F. Kurose, Don Towsler INFOCOM 1989; pp. 774–783.

NonStationary Analysis of Scheduling Bursty Real–Time and Non–Real–Time Traffic, Robert A. Lackman, Clemson University, May 1992.

*Primary Examiner*—Ayaz R. Sheikh
*Assistant Examiner*—Rupal D. Dharia

[57] ABSTRACT

Data is transferred over a bus from one device to another, or between one device and another system resource, such as a central processor. This data is classified into one of several types. "Hard real time" data must be transferred within a specified time limit or "deadline" and it is unacceptable to miss a deadline. "Soft real time" data should be transferred before a deadline and, although some missed deadlines are tolerable, the lower the number of missed deadline the better. "Loss sensitive" data has no deadlines, but any loss of data is unacceptable. "Non-real time" data also has no deadlines, but the lower the time delay in transferring the data the better. The intelligence that controls the transfer of data and schedules access to the bus is distributed throughout the system. Part of this scheduling intelligence is included in the bus arbiter, while the remainder is incorporated in the devices themselves.

4 Claims, 3 Drawing Sheets

DISTRIBUTED SCHEDULING FOR THE TRANSFER OF REAL TIME, LOSS SENSITIVE AND NON-REAL TIME DATA OVER A BUS

BACKGROUND OF THE INVENTION

This invention pertains to computer systems and other information handling systems and, more particularly, to a computer system having a distributed scheduling algorithm for the transfer of various classes of data (e.g., real time data, loss sensitive data and non-real time data) over a bus.

Data to be transferred from one point to another can be classified into one of several categories depending on how critical it is to transfer the data within a specified time limit, and the tolerance for loss of any portion of the data. Four classifications of data are described immediately below.

"Hard real time data" is data that must be transferred within a specified time limit, i.e., before a "deadline". Failure to transfer any portion of the data before the deadline is catastrophic because critical data will be lost. Thus, the performance objective for the transfer of hard real time ("HRT") data is "no missed deadlines" and, consequently, no lost data.

"Soft real time data" is data that should be transferred within a specified deadline and failure to transfer before the deadline results in lost data, but loss of some data is tolerable. The performance objective for the transfer of soft real time ("SRT") data is "low percentage of missed deadlines" and, consequently, a low percentage of lost data.

"Loss sensitive data" is data that has no deadline within which it must be transferred. Any loss of data, however, is intolerable. Thus, the performance objective for loss sensitive ("LS") data is "minimal lost data". Note that delay is irrelevant when measuring the performance of loss sensitive data transfers. In other words, it doesn't matter how long it takes to get there, as long as all the data gets transferred.

"Non real time data" is also data that has no deadline within which it must be transferred. But the performance measurement for non-real time ("NRT") data is "low delay". In other words, less delay is better.

Devices in a computer system, such as network adapters and disk drive adapters, are usually interconnected via a bus to permit the transfer of data from one device to another, and from one device to and from other system resources, such as the central processor and memory. Each of these devices has a particular type of data that it normally transfers, such as real time, loss sensitive or non-real time data. An arbiter is usually connected to the bus to make decisions as to which device will get current access to the bus. Thus, when two or more devices need to use the bus at the same time, the arbiter decides which device gets access and when.

In one advanced system (specifically, one employing the DEC 21150 PCI to PCI bridge chip, which includes a secondary bus arbiter), the bus arbiter uses a two level priority scheme and implements "fairness" within each priority group. With fairness, if there is more than one device of the same priority level requesting bus access at the same time, the arbiter rotates bus access from one device to the next, thereby preventing one device from monopolizing the bus. Fairness, however, does not cross the boundary between one priority level and another. Therefore, even with fairness, one or more high priority devices can potentially monopolize the bus from a low priority device, causing data loss for the low priority device.

Several schemes have been described that provide a trade-off between real time, non-real time and loss sensitive data traffic. In minimum laxity threshold ("MLT") scheduling, non-real time devices are serviced first, unless the "laxity" of a soft real time device is less than a threshold ("laxity threshold"). "Laxity" is the time remaining until a deadline is reached; in other words, the time preceding a deadline. And if the deadline is reached, data will be lost. Thus, MLT provides a near optimal trade-off between soft real time and non-real time data.

In minimum buffer threshold ("MBT") scheduling, non-real time data is serviced first, unless the buffer of a loss sensitive device is within a threshold ("buffer threshold") of overflowing. And if the buffer overflows, loss sensitive data will be lost. Thus, MBT provides a near optimal trade-off between loss sensitive and non-real time data traffic.

The problem with the MLT and MBT schemes, both of which have been previously proposed and studied, is that they are not implementable on a bus because the arbiter has no knowledge of the laxity thresholds of the soft real time devices, and the buffer thresholds of loss sensitive devices. Although it would be possible to add control lines to the bus whereby threshold and other information could be conveyed to the arbiter, one object of the present invention is to provide an improved scheduling scheme that does not require additional bus lines. Another object of the invention is to provide a scheduling system for transferring data over a bus that approximates the combined performance of both MLT and MBT schemes to provide near optimal trade-off between all fours types of data; hard real time, soft real time, loss sensitive and non-real time. To accomplish these and other objectives, the present invention uses a distributed scheduling scheme that puts part of the scheduling intelligence in the arbiter, and the other part in the devices themselves.

DESCRIPTION OF THE ILLUSTRATIVE EMBODIMENTS

Figure 1:
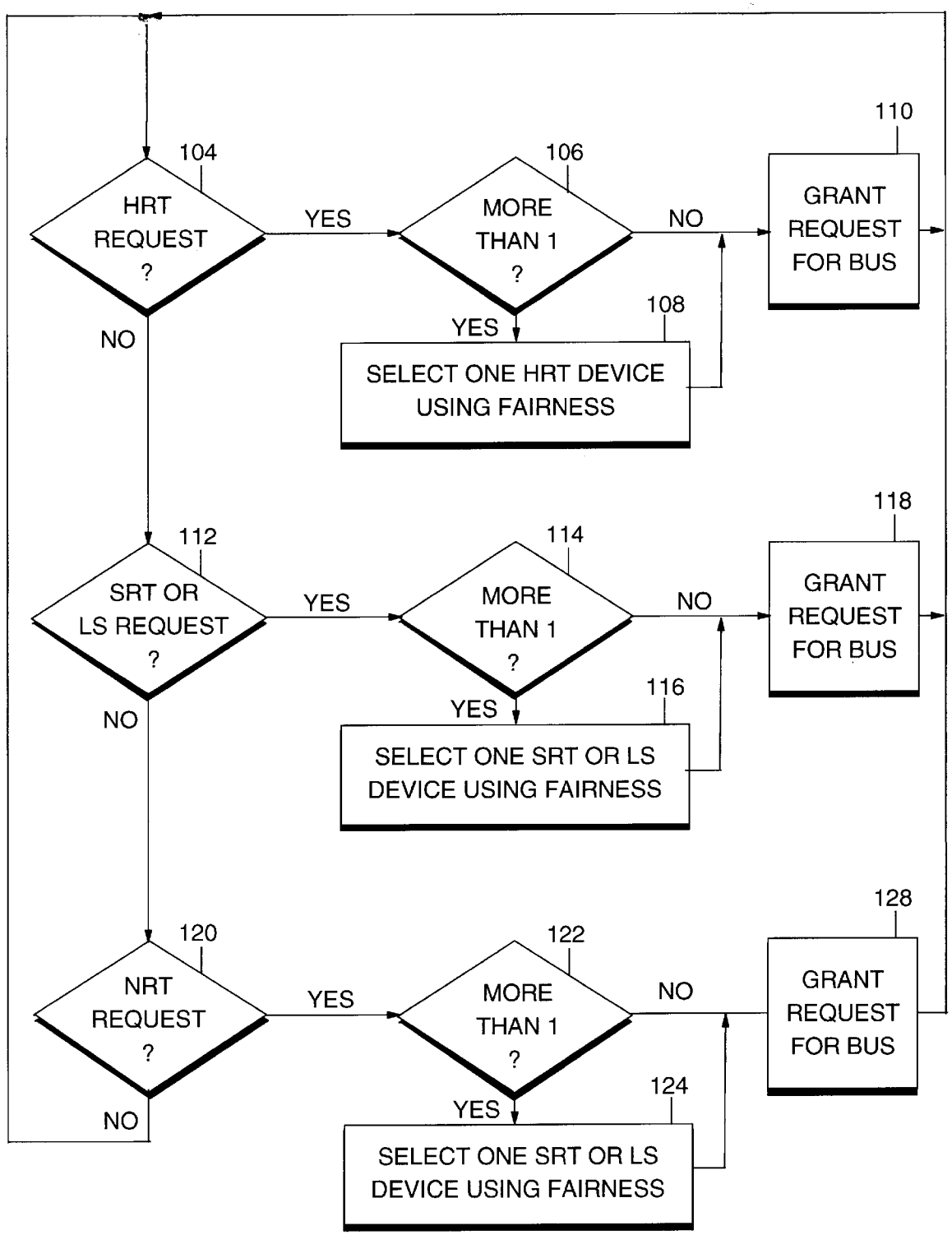
FIG. 1 is a flow diagram of that portion of the distributed scheduling algorithm that resides in the arbiter.

FIG. 1 is a flow diagram of that portion of the bus access scheduling algorithm that resides in the arbiter. At first step 104, if there have been no requests for the bus from any of the hard real time (HRT) devices, the process branches to step 112. Otherwise, if there has been a request for the bus from an HRT device, the arbiter branches to step 106. A step 106, if the arbiter determines that there has been more than one HRT request, it branches to step 108 where fairness is implemented. After selecting which particular HRT device to service in step 108, or if there is only one HRT device needing bus access as determined in step 106, the arbiter branches to step 110 where it grants bus access to the appropriate HRT device. Upon completion of the selected HRT device's use of the bus, the arbiter returns to step 104.

If there are no HRT devices needing bus access, as determined in step 104, and the arbiter determines in step 112 that there are no soft real time (SRT) or loss sensitive (LS) devices needing bus access, the arbiter branches to step 120. Otherwise, if there has been a request for bus access from an SRT or LS device, the arbiter branches to step 114. If, at step 114, the arbiter determines that there has been more than one request from an SRT or LS device, it branches to step 116 where fairness is implemented. After selecting which particular SRT or LS device to service in step 116, or if there is only one SRT or LS device needing bus access as determined in step 114, the arbiter then branches to step 118 where it grants access to the appropriate SRT or LS device. Upon completion of the SRT or LS device's use of the bus, the arbiter returns to step 104.

If there are no HRT, SRT or LS devices needing bus access, as determined in steps 104 and 112, and the arbiter determines in step 120 that there are no non-real time (NRT) devices needing bus access, the arbiter branches to first step 104. Otherwise, if there has been a request for bus access from an NRT device, the arbiter branches to step 122. If, at step 122, the arbiter determines that there has been more than one request from an NRT device, it branches to step 124 where fairness is implemented. After selecting which particular NRT device to service in step 124, or if there is only one NRT device needing bus access as determined in step 122, the arbiter branches to step 128 where it grants access to the appropriate NRT device. Upon completion of the NRT device's use of the bus, the arbiter returns to first step 104.

The process for the arbiter described above and illustrated in FIG. 1 is preferably implemented in hardware in the form of a well known state machine, although other hardware or software implementations may also be used. Briefly, this process grants priority to hard real time requests first, with soft real time and loss sensitive requests grouped together and assigned to a second level of priority, while non-real time requests receive a third or lowest level of priority. Although the assignment of priority levels to various types of data is fairly standard, the fact that the arbiter knows which devices are associated with a certain class of data is not. Within each group, the arbiter uses a well known fairness protocol to determine which one of a plurality of requests will be granted current access to the bus, and also to prevent one device from monopolizing the bus to the exclusion of other devices of the same type.

Because one or more high priority HRT devices could monopolize the bus from other lower priority SRT, LS or NRT devices (and, similarly, one or more higher priority SRT or LS devices could monopolize the bus from other lower priority NRT devices), one embodiment of the invention grants bus access to one lower priority device for every "n" times through the higher priority "loop." For example, a plurality of HRT devices could monopolize the bus and keep the arbiter in the high priority loop consisting of steps 104, 106, 108 and 110 for an extended period of time. But after "n" times through this high priority loop, the arbiter branches to the appropriate lower priority loop (e.g., the loop consisting of steps 112, 114, 116 and 118 for SRT and LS devices, or the loop consisting of steps 120, 122, 124 and 128 for NRT devices) and grants bus access to one lower priority device before returning to the high priority loop. In this embodiment, "n" is programmable and is preferably equal to 2 or greater. This particular variation of the invention is not illustrated in the drawing figures.

Figure 2:
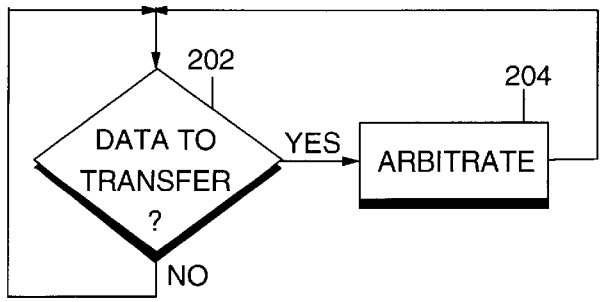
FIG. 2 is a flow diagram of that portion of the distributed scheduling algorithm that resides in a hard real time (HRT) or non-real time (NRT) device.

FIG. 2 is a flow diagram for that portion of the bus scheduling algorithm that resides in a hard real time (HRT) device. In first step 202, if the HRT device has a need for the bus, the process branches to step 204 where the device arbitrates for the bus. Otherwise, it waits until it has a need for the bus. Briefly, this process is quite simple; if there is a need for the bus, an HRT device immediately arbitrates for the bus.

Typically, the bus has a "REQUEST" and "GRANT" line for each device on the bus, and any one or more devices can assert a REQUEST (i.e., pull the voltage on its REQUEST line to the "active" state). The system arbiter, upon receiving one or more requests for bus access, makes a determination as to the order in which each requesting device will be granted access to the bus. Upon making that determination, the arbiter will assert the GRANT line for the particular device given current access to the bus.

Figure 3:
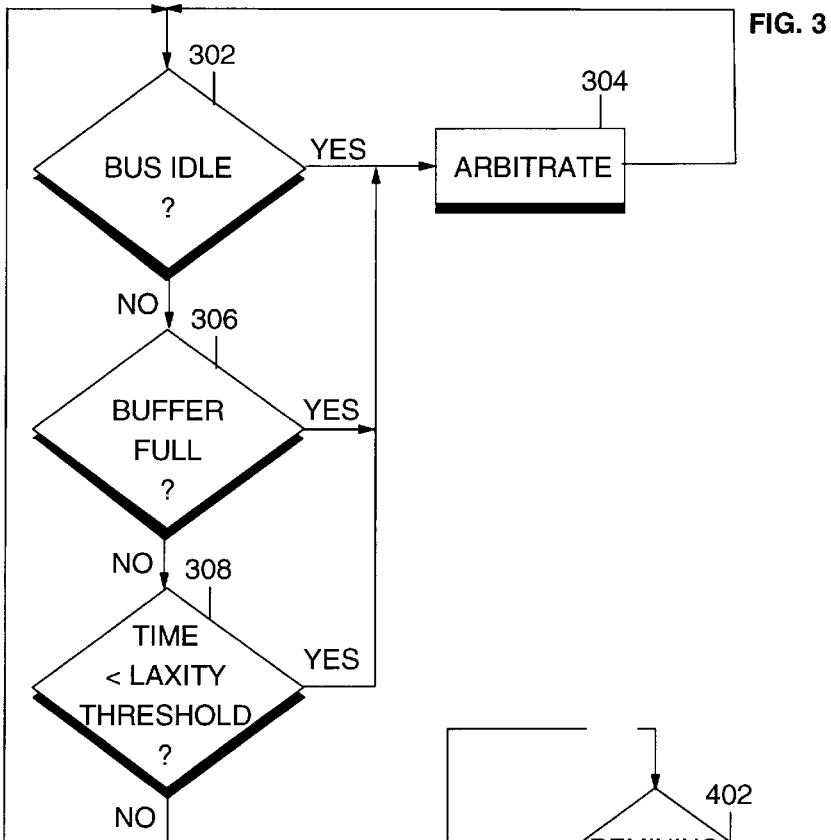
FIG. 3 is a flow diagram of that portion of the distributed scheduling algorithm that resides in a soft real time (SRT) device.

FIG. 3 is a flow diagram of that portion of the scheduling algorithm that resides in a soft real time (SRT) device. In first step 302, the device checks bus activity and if the bus is idle, the process branches to step 304 where the device arbitrates for the bus. If the bus is not idle, the process branches to step 306 where the device checks the fill level of the buffer(s). If the buffer is full, the process proceeds to step 304 where the device arbitrates for the bus. If the buffer is not full, the process proceeds to step 308. At step 308, if the time remaining to transfer the current data in the buffer is less than the laxity threshold (an amount of time preceding a deadline, wherein exceeding the deadline will result in lost data) the process branches to step 304 where the device arbitrates for the bus. If the time remaining is greater than or equal to a laxity threshold, the process returns to first step 302.

Briefly, this process causes an SRT device to immediately arbitrate for the bus if the bus is idle (no other devices using the bus, including the CPU) or if its buffer is full (if the buffer is full, its in immediate danger of overflowing and, consequently, loosing data). If there is data in the buffer, but the time remaining until a deadline is reached is less than a laxity threshold, then the device arbitrates for the bus. Otherwise, if the remaining time is greater than or equal to a laxity threshold, then no arbitration occurs and the device waits until the laxity threshold has been exceeded, the bus is idle, or the buffer becomes full.

Figure 4:
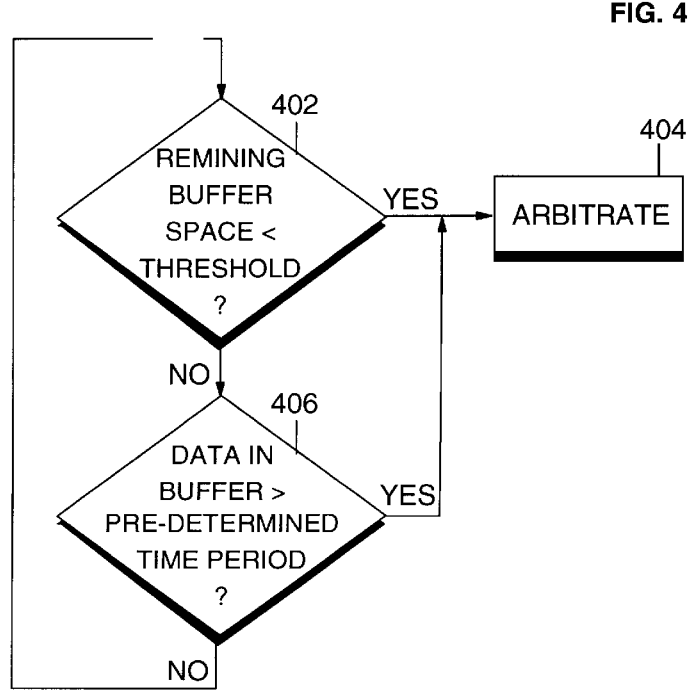
FIG. 4 is a flow diagram of that portion of the distributed scheduling algorithm that resides in a loss sensitive (LS) device.

FIG. 4 is a flow diagram of that portion of the scheduling algorithm that resides in a loss sensitive ("LS") device. In first step 402, if the remaining buffer space is within a "buffer threshold" of being full, the process branches to step 404 where the device arbitrates for the bus. If the remaining buffer space is greater than or equal to a buffer threshold, the process branches to step 406 where the device checks the time that the data has been in the buffer. If the data has been in the buffer for more than a predetermined "maximum elapsed" period of time, then the process branches to step 404 wherein the device arbitrates for the bus. If the time is less than or equal to the predetermined period of time (or if there is no data in the buffer), then the process returns to step 402.

Note that the predetermined maximum elapsed period of time for a loss sensitive device is different from a laxity time for a soft real time device. More specifically, the laxity threshold for an SRT device is an amount of time that precedes a deadline. Since, by definition, LS devices do not have deadlines, they cannot have a laxity threshold. So the predetermined maximum elapsed period of time for an LS device is measured beginning from the time the data first enters the buffer.

FIG. 2 also represents a flow diagram for a non-real time (NRT) device. Briefly, if an NRT device needs access to the bus, it arbitrates. Remember that this is a distributed arbitration scheme. Thus, to determine the priority a particular type of device may have at any given time, one must look not only to the scheduling algorithm implemented in the device itself, but also to the algorithm implement in the arbiter. In other words, the overall scheduling algorithm for any particular type of device is determined by the scheduling algorithm implemented in the arbiter, in combination with the scheduling algorithm implemented in the device itself. Consequently, even though an NRT device implements the same internal scheduling algorithm as an HRT device, its overall ability to access the bus is quite different from an HRT device.

Figure 5:
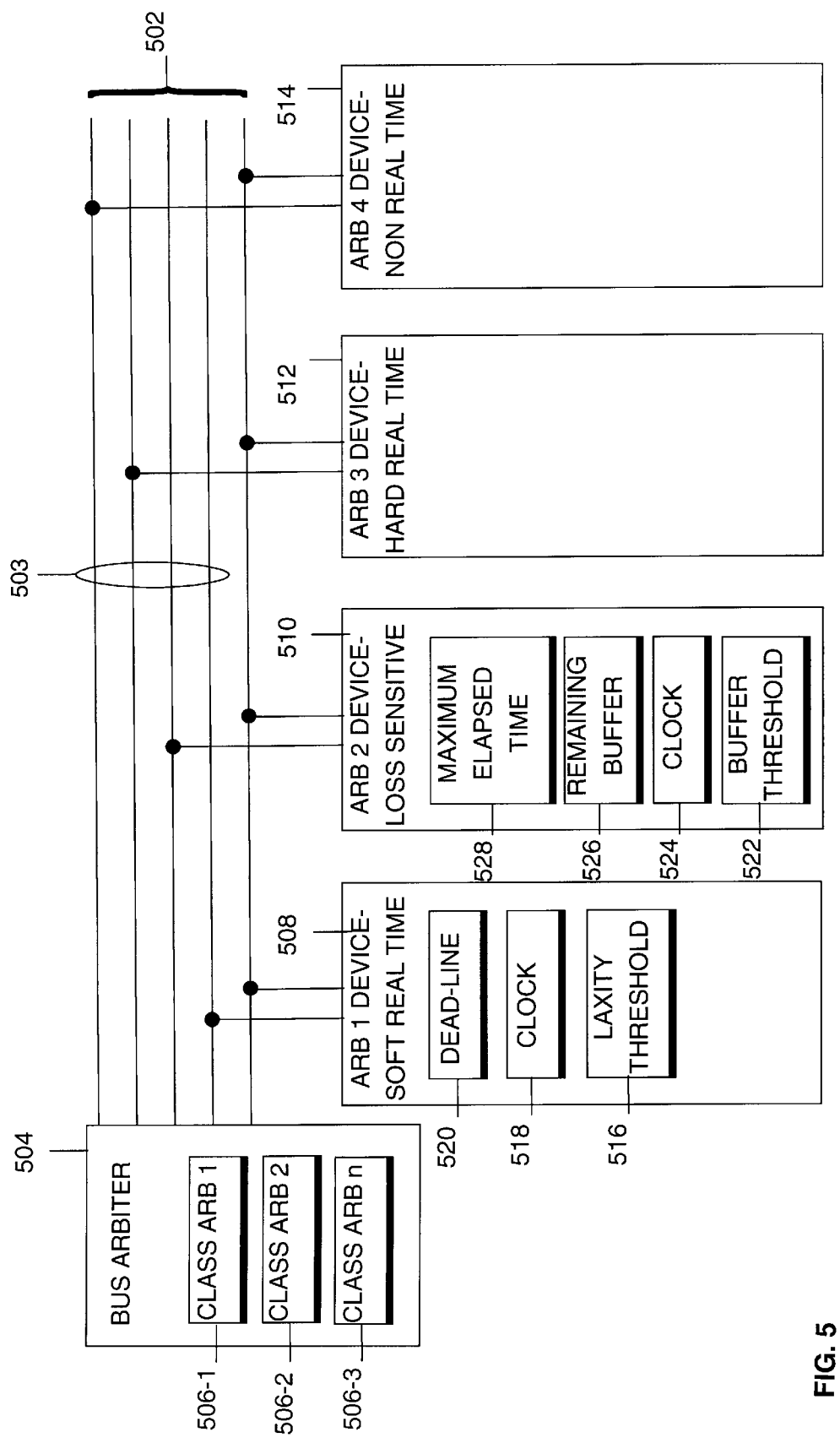
FIG. 5 is a block diagram of a computer system employing the distributed scheduling algorithm of the present invention.

FIG. 5 is a block diagram of a computer system that incorporates the distributed scheduling algorithm of the present invention. Referring to this figure, a computer bus 502, such as a well known MicroChannel or PCI bus, includes a plurality of arbitration channels 503 (four channels are illustrated in FIG. 5; one for each device 508, 510, 512 and 514). Each channel consists of one arbitration "REQUEST" line and one bus "GRANT" line (not illustrated), whereby a device can send a request for bus access to the arbiter over its unique REQUEST line, and the arbiter can grant bus access to a selected device by asserting its unique GRANT line.

An arbiter 504 implements that portion of the scheduling algorithm described with reference to FIG. 1, and includes separate Arbitration Class Registers 506-1, 506-1 through 506-n for up to "n" devices that may be connected to the bus 502. Each of the Arbitration Class Registers corresponds to a particular device on the bus, and each register is programmed with a code that indicates the class of data (e.g., hard real time, soft real time, loss sensitive or non-real time) that its corresponding device will be transferring over the bus. These Arbitration Class Registers are preferably programmed by the system at power on self test, although each of these registers may be set or changed at a later time.

A soft real time device 508 is connected to bus 502. SRT device 508 includes a Laxity Threshold Register 516, a Clock 518, and a Deadline Register 520. The laxity threshold parameter described above is programmed into the Laxity Threshold Register 516; preferably at power on self test, although this parameter may be set by other means or changed at other times. Each SRT device has sufficient intelligence to know its deadline parameter, which is loaded into the Deadline Register 520. The Clock 518 is used to measure the length of time that data has been in the buffer, and to detect when that time is within a laxity threshold of a deadline.

A loss sensitive device 510 is also connected to the bus. LS device 510 includes a Buffer Threshold Register 522, a Clock 524, a Remaining Buffer Register 526, and a Maximum Elapsed Time Register 528. The buffer threshold and maximum elapsed time parameters described above are programmed into the Buffer Threshold Register 522 and the Maximum Elapsed Time Register 528, respectively; preferably at power on self test, although these parameters may be set by other means or changed at other times. The Clock 518 is used to measure the length of time that data has been in the buffer, and to detect when that time has exceeded the maximum elapsed time. The LS device has well known circuitry to detect the amount of buffer space remaining in the buffer at any given time, and this information is periodically updated and stored in Remaining Buffer Register 526.

A hard real time device 512 and non-real time device 514 are also connected to bus 502. Because each of these device types requests bus access as soon as they have any data to transfer, no additional registers are required.

As with the arbiter, the algorithms for each of the HRT, SRT, LS and NRT devices are is preferably implemented in hardware in the form of a well known state machine, although other hardware or software implementations may also be used.

The settings of the thresholds will depend on the performance objectives of the system. Recall that the performance measurement for soft real time data is a low percentage of missed deadlines, while the performance measurement for non-real time data is low delay. Thus, once the performance objectives have been determined for a particular system, the initial setting of the thresholds can best be determined by modeling, although other techniques may be used. After the initial settings have been determined and loaded into the appropriate registers (e.g., the Laxity Threshold Register and the Buffer Threshold Register), the system performance can be monitored and measured, and the performance adjusted by making incremental adjustments to the various register settings. Preferably, the system continuously monitors performance and dynamically adjusts the threshold settings to achieve specified performance objectives.

For example, an incremental increase in the laxity threshold setting will improve the performance of soft real time data transfers, while degrading non-real time data transfers and, potentially, loss sensitive data transfers. Decreasing the laxity threshold setting will degrade the performance of soft real time data transfers, while improving the performance of non-real time and, potentially, loss sensitive data transfers.

The setting in the Buffer Threshold Register should be at the minimum required to insure that minimal data is lost. Increasing the buffer threshold beyond this minimum setting will, of course, result in loss sensitive data being transferred more expeditiously. However, rapid transfer of data is not the performance criterion for loss sensitive data; "no lost data" is. Consequently, increasing the buffer threshold beyond the minimum setting required to insure that no data is lost does not improve the performance of loss sensitive data transfers. Increasing the buffer threshold, however, will degrade the performance for soft real time and non-real time devices.

We claim as our invention:

1. A computer system having distributed intelligence for scheduling and controlling the transfer of data over a bus, said computer system comprising:

a bus having a plurality of arbitration channels, each said arbitration channel carrying request and grant information to control access to the bus;

an arbiter coupled to said bus, said arbiter having a plurality of class registers for storing information indicative of the class of data to be transferred over said bus, each said class register being associated with a unique one of said arbitration channels;

a first device for transferring a first class of data over said bus, said first device being coupled to a first one of said arbitration channels, said first device includes a first buffer for storing data to be transferred over said bus and a laxity threshold register for storing a laxity threshold setting, said first class of data having an associated deadline before which any data in said first buffer should be transferred over said bus;

a second device for transferring a second class of data over said bus, said second device being coupled to a second one of said arbitration channels, said second device includes a second buffer for storing data to be transferred over said bus and a buffer threshold register for storing a buffer threshold setting, said second buffer having an associated "fill level" corresponding to the amount of data stored in said second buffer; and scheduling means for scheduling and controlling access to said bus according to an overall scheduling algorithm, a first portion of said scheduling means residing in said first device, said first portion of said scheduling means arbitrates for said bus when data has been in said first buffer for a period of time equal to said deadline minus said laxity threshold setting, a second portion of said scheduling means residing in said second device, said second portion of said scheduling means arbitrates for said bus when the fill level of said second buffer is less than a buffer threshold setting from full, and a third portion of said scheduling means residing in said arbiter, such that the overall scheduling algorithm for said first device is determined by the combination of the scheduling algorithms implemented in said arbiter and in said first device, and such that the overall scheduling algorithm for said second device is determined by the combination of the scheduling algorithms implemented in said arbiter and in said second device.

2. The computer system of claim 1, wherein said first class of data is soft real time data.

3. The computer system of claim 1, wherein said second class of data is loss sensitive data.

4. The computer system of claim 2, wherein said second class of data is loss sensitive data.

* * * * *